United States Patent
Kingsbury et al.

(10) Patent No.: US 6,440,335 B1
(45) Date of Patent: *Aug. 27, 2002

(54) PROCESS FOR MOLDING THERMOPLASTIC LENSES AND, STEEPLY CURVED AND/OR THIN LENSES PRODUCED THEREBY

(75) Inventors: Jeffrey M. Kingsbury, deceased, late of Cotati, by Valerie Kingsbury, legal representative; Robert H. Juul, Santa Rosa; Michael J. Tuhtan; Martin D. Rolph, both of Sebastopol; Michael A. Morris, Santa Rosa, all of CA (US); Colin M. Perrott, Mount Barker; Simon J. Edwards, St. Peters, both of (AU); Ray S. Spratt, Petaluma, CA (US)

(73) Assignee: Sola International, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/658,496

(22) Filed: Sep. 8, 2000

Related U.S. Application Data

(63) Continuation-in-part of application No. 09/277,035, filed on Mar. 25, 1999, now Pat. No. 6,284,162, and a continuation-in-part of application No. 09/223,006, filed on Dec. 30, 1998.

(51) Int. Cl.[7] .............................................. B29D 11/00
(52) U.S. Cl. .................... 264/2.2; 264/328.7; 264/328.8
(58) Field of Search .......................... 264/2.2, 1.1, 2.3, 264/328.7, 328.8; 425/808

(56) References Cited

U.S. PATENT DOCUMENTS

| | | |
|---|---|---|
| 1,741,536 A | 12/1929 | Rayton |
| 1,918,999 A | 7/1933 | Wells |
| 1,942,400 A | 1/1934 | Glancy |
| 2,443,286 A | 6/1948 | Weston |
| 3,526,449 A | 9/1970 | Bolle et al. |
| 4,008,031 A | 2/1977 | Weber |
| 4,091,057 A | 5/1978 | Weber |
| 4,364,878 A | 12/1982 | Laliberte et al. |
| 4,741,611 A | 5/1988 | Burns |

(List continued on next page.)

FOREIGN PATENT DOCUMENTS

| | | |
|---|---|---|
| EP | 0225034 | 6/1987 |
| EP | 0348129 | 12/1989 |
| EP | 0446698 | 9/1991 |
| EP | 0547762 | 6/1993 |
| EP | 640523 A1 | 3/1995 |
| FR | 1509090 | 11/1966 |
| FR | 2688322 | 9/1993 |
| GB | 680400 | 10/1952 |
| GB | 2281635 | 3/1995 |
| JP | 61-66623 | 4/1986 |
| WO | WO96/13236 | 5/1996 |
| WO | WO 9721139 | 6/1997 |
| WO | WO97/35224 | 9/1997 |
| WO | WO97/41483 | 11/1997 |

OTHER PUBLICATIONS

Patent Abstracts of Japan, vol. 10, No. 62 (M–460), Mar. 12, 1986, JP 60–208215, Hitachi Seisakush KK, Oct. 19, 1985.
Patent Abstracts of Japan, vol. 18, No. 438 (M–1656), Aug. 16, 1994, JP 06–135223, Nippondenso Co., Ltd., May 17, 1994.
M. Jalie, *The Principles Of Ophthalmic Lenses*, pp. 1–27, 30–33, 151–152, 422–441, 462–468 (4th Ed. London 1994).

*Primary Examiner*—Mathieu D. Vargot
(74) *Attorney, Agent, or Firm*—Burns Doane Swecker & Mathis, L.L.P.

(57) ABSTRACT

Disclosed are novel molding methods for injection molding thermoplastic lens elements and particularly adapted for the manufacture of steeply curved and/or thin-centered lenses.

21 Claims, 12 Drawing Sheets

U.S. PATENT DOCUMENTS

| | | |
|---|---|---|
| 4,778,266 A | 10/1988 | Maitenaz |
| 4,779,972 A | 10/1988 | Gottlieb |
| 4,828,769 A | 5/1989 | Maus et al. |
| 4,836,960 A | 6/1989 | Spector et al. |
| 4,900,242 A | 2/1990 | Maus et al. |
| 5,094,520 A | 3/1992 | Reshef et al. |
| 5,187,505 A | 2/1993 | Spector |
| 5,208,614 A | 5/1993 | Jannard |
| 5,340,528 A | 8/1994 | Machida et al. |
| 5,376,317 A | 12/1994 | Maus et al. |
| 5,512,221 A | 4/1996 | Maus et al. |
| 5,517,260 A | 5/1996 | Glady et al. |
| 5,604,547 A | 2/1997 | Davis et al. |
| 5,648,832 A | 7/1997 | Houston et al. |
| 5,689,323 A | 11/1997 | Houston et al. |
| 5,718,849 A | 2/1998 | Maus et al. |
| 5,764,332 A | 6/1998 | Kranhouse |
| 5,825,455 A | 10/1998 | Fecteau et al. |
| 5,861,935 A | 1/1999 | Morris et al. |
| 5,968,439 A | 10/1999 | Grove |
| 6,129,435 A | 10/2000 | Reichow et al. |
| 6,284,162 B1 * | 9/2001 | Kingsbury et al. .......... 264/2.2 |

* cited by examiner

FIG. 8(a) Comparison of Lens Cross-Sections

FIG. 9(c)
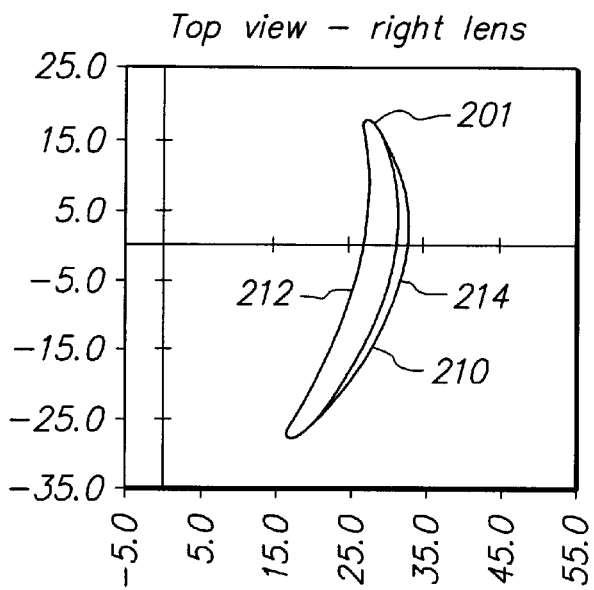
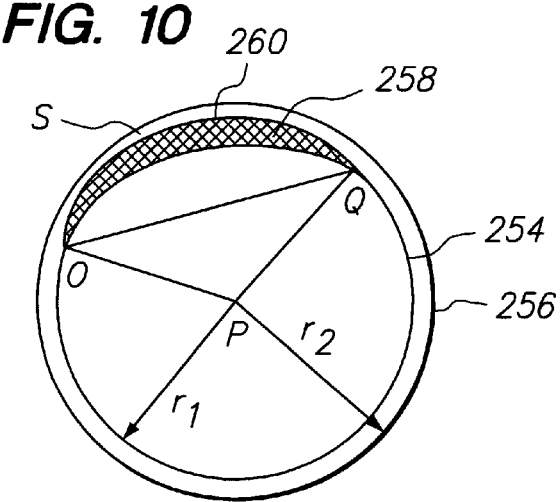
FIG. 10
FIG. 11
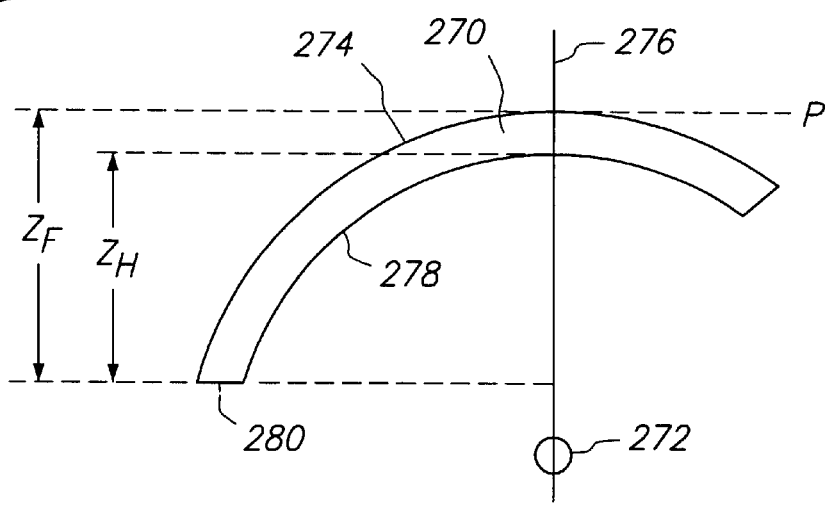

PROCESS FOR MOLDING THERMOPLASTIC LENSES AND, STEEPLY CURVED AND/OR THIN LENSES PRODUCED THEREBY

RELATED APPLICATIONS

This application is a continuation-in-part of U S. application Ser. No. 09/277,035, filed Mar. 25, 1999, to Kingsbury et al. entitled "Molding Method For Manufacturing Thin Thermoplastic Lenses" and of U.S. application Ser. No. 09/223,006, filed Dec. 30, 1998, to Morris et al. entitled "Wide Field Spherical Lenses And Single Design Spectacle Frames Therefor". Both applications are hereby incorporated by reference in their entirety.

BACKGROUND OF THE INVENTION

Field of the Invention

This invention relates to novel molding methods for the manufacture of thermoplastic lenses and is particularly adaptable for the manufacture of steeply curved ophthalmic lenses and ophthalmic lenses with thin centers. The invention includes the resultant lenses.

Lens Molding

Lenses are used for a variety of purposes, for example in optical devices such as microscopes and eye glasses. Over the past few years, the use of thermoplastic material to prepare ophthalmic lenses for such uses as in vision corrective and in prescriptive ($R_x$) spectacle lenses as opposed to traditional glass lenses has increased dramatically because thermoplastic lenses offer several advantages over glass. For example, plastic is lighter than glass and hence spectacles with plastic lens are more comfortable to wear especially since the nominal lens thickness is typically 2.0–2.2 mm. Other factors for increased demand for thermoplastic lenses are that these lenses can be made scratch and abrasion resistant, they come in a wide range of fashionable colors, and because the production techniques have improved so that they can now be manufactured at higher rates and in a more automated fashion.

Of the thermoplastic lenses, the use of polycarbonate thermoplastic is becoming very attractive as compared to, for example, lenses made from individual casting and thermoset-peroxide curing allylic resins. Factors favoring polycarbonate thermoplastic lenses include lower density and higher refractive index than cast-thermoset plastic. Hence, thinner lenses in the range of 1.5–2.0 mm thickness can be made. In addition, polycarbonate lenses of the same nominal thickness as thermoset-peroxide cured allylic resins will be of lighter weight, due to lower density, and therefore will impart greater wearer comfort. Furthermore, polycarbonate thermoplastic lenses have far greater impact and breakage resistance than any other optical grade polymeric material.

Heretofore, thermoplastic, injection-molded lenses have been manufactured by injection molding with or without any compression. Injection molding without any compression typically involves the use of a mold cavity having fixed surfaces throughout the molding cycle. Such molding processes employ very long molding cycles, high mold-surface temperatures, higher than average plastication and melt temperatures for that given resin, and slow controlled fill rates followed by very high packing pressures which are held until gate freeze-off is complete.

Fixed cavity processes of the type described above, employ larger than normal gating and runner systems to permit maximum packing pressure and delivered material before gate freeze-off occurs, at which time no further transfer of molten polymer occurs between the runner system or plasticating unit and the cavity. Gate freeze-off in a fixed cavity injection machine presents a problem, given that powered lenses have differing front and back radii of curvature, prescription lenses must therefore have differing cross-sectional thicknesses which in turn leads to non-uniform shrinkage during part formation in the mold cavity and cooling-down which can cause poor optics and/or distortion. In addition, the thickest sections of the lens are subject to slight sink marks or depressions which in turn cause a break in the otherwise uniform radius of curvature of the lens surface. This break results in a localized aberration or deviation in the light bending character of the lens at that area of sink.

Thus, although great care is taken to see that the injected polymer mass conforms perfectly to the fixed lens mold cavity surface, contour, and dimensions, once gate freeze-off prevents additional packing pressure and material transfer, differential shrinkage begins to occur within the polymer melt and the polymer skin begins to pull away from the mold surfaces accordingly. This pre-release detrimentally affects optical quality since the molded lens contour and surface no longer can be forced by intimate contact to exactly replicate the precision optical mold surfaces and cure contours. Also, a fixed cavity molding process is limited in how thin the lens center can be. Below about 2 mm, the molten plastic preferentially flows around the thick edge leaving a void and/or knit line which extends into the central zone of the to-be-formed lens.

To address these problems with fixed cavity molding processes, compression molding techniques have been used. The injection/compression molding techniques are divided into two types (i) the clamp-end injection/compression and (ii) the auxiliary component injection/compression. In the clamp-end injection/compression method, the molten polymer is injected into a mold space formed by moving the mold platens and mold halves to a predetermined position. After or during injection, the molten polymer mass is allowed to cool for a predetermined time interval and the injection molding machine commences a closing motion of the movable platen. This clamping-up motion compensates for shrinkage occurring during freezing of the molten polymer. Under this clamp-induced compressive force, the mold cavity's contents continue cooling and solidifying, eventually reaching a temperature sufficiently below the glass-transition temperature, or freezing point, of the injected polymer that the molded article may be safely ejected without risking optical distortion. However, in view of the high clamp pressure, thin centered lenses may be subjected to crushing of the frozen center portion while the remaining areas of the mold retain molten polymer.

This method however, has severe limitations. First, it is critical to carefully control the injection pressure and fill rate, along with the timing interval. For example, the injected melt must be allowed to form a surface skin and partially solidify to prevent molten polymer from spilling outside the desired runner-mold-cavity configurations, necessitating costly and laborious trimming operations on the molded part. Second, if the melt solidifies to too great an extent, compression at ultimate clamping pressures can cause hobbing or deformation of the mating plats at the parting line, thus damaging the mold set. Third, if compression is delayed too long, too much polymer solidification will have occurred when the compressive force through final clamp-up is initiated, resulting in forcible reorientation of the polymer and cold working of the plastic, which, in turn, produces birefringence and undesirable molded-in stress levels, with resulting localized nonuniform light-bending characteristics.

In the auxiliary component injection/compression method the compressive pressure is applied to the opposing optical surfaces via auxiliary springs, cylinders or the like which are either internal to the mold itself or as peripheral apparatus thereto. Early thermoplastic lens molding of this type employed simple spring-loaded, movable optical dies within the mold set. Johnson, et al., "Compressor Unit", U.S. Pat. No. 2,443,826, issued Jun. 22, 1948. Such apparatus created a variable volume lens mold cavity thereby, but relied upon high internal polymer melt pressure to spread the movable dies against the resisting spring pressure. In order to apply sufficiently great compressive forces upon the solidifying mold contents, these spring forces were great. However, the greater the spring force, the greater the injection pressure that must be used to compress the springs during variable cavity fill. The greater the injection pressure required, the greater the degree of molded-in stresses and optically unsatisfactory birefringence. The greater the optical power for the molded lens, the greater the dissimilarity between the front and back curves and thus the greater the cross-sectional thickness variation. Therefore, this process is limited to production of weakly powered lenses with minimal diameter and minimal thickness variations.

Another auxiliary component process is represented by the patents to Weber: "Apparatus for Injection Molding Lenses", U.S. Pat. No. 4,008,031, issued Feb. 15, 1977; and "Method for Injection Molding Lenses", U.S. Pat. No. 4,091,057, issued May 23, 1978. Weber teaches a variable-volume cavity formed by injection-melt, pressure induced rearward deflection of at least one movable male or female die which after a certain interval is followed by forward displacement resulting in compression under the driving force of an auxiliary hydraulic cylinder mounted in one-to-one relationship with this movable die. Flow ports are provided through which excess polymer melt is forcibly extruded from the lens cavity under the compressive forces. Weber too relies upon a preset amount of time to elapse between completion of injection fill and commencing compressive pressure. Therefore, this process too suffers from defects caused by premature compression or excessively delayed compression discussed above. Additionally, this process can produce lenses of inconsistent thickness.

Another auxiliary component process is described by Laliberte. Laliberte, "Method for Molding Ophthalmic Lenses", U.S. Pat. No. 4,364,878, issued Dec. 21, 1982. This process includes a movable die coupled to an auxiliary hydraulic cylinder. After the mold is closed under clamp pressure, the mating die parts are spread apart by injection of a polymer. A fixed amount of polymer, adequate to fill the fully compressed mold-cavity system is then injected. This process permits greater control of nominal lens thickness and therefore eliminates material scrap waste and trimming operations. However, Laliberte discloses lens thickness control but only with regard to nominal 3.0 mm center thickness which is significantly greater than the desired consumer lens thickness.

Another major short-coming of the injection/compression molding processes described above is that they are unsuitable for manufacturing $R_x$ lenses, especially minus thermoplastic lenses having a center thickness of about 1 mm or less and having edge thicknesses greater than the center thickness. This is because the injected thermoplastic melt in the thinner center portion of the minus lens freezes prior to the freezing of the melt in the thicker edge portions. As a result, the compressive pressures generated by the mold halves (optical inserts) at this point of solidification is focused only on the frozen center portion which crushes or otherwise distorts this part of the lens. Such crushing or distorting of the frozen center is particularly problematic at center thicknesses of about 1 mm or less and having molten edge thicknesses substantially larger since the entire compressive force is concentrated on a small diameter, thin column of frozen material at the center. Also, this force exceeds the compressive strength of the solidified material. However, as is apparent, thin centered minus lenses having a thickness of about 1 mm or less are particularly desirable as having still further reduction in weight as compared to conventional minus lenses having a center thickness greater than about 1 mm (e.g., 1.5 mm).

In view of the inability of injection/compression molding processes to prepare thin centered minus lenses, such lenses have been manufactured by abrading and polishing thicker lenses. Such manufacturing techniques employ abrading and polishing elements such as optical curve generating, fining and polishing machines which inevitably leave abrasion/polishing residues on the lens surface and/or leave negative fining marks below the nominal surface.

Steeply Curved Lenses

Applicants have been involved in the development and manufacture of various types of steeply curved lenses, including unpowered lenses, sun lenses and prescription plus or minus lenses. Such lenses have a higher curvature than conventional Ostwalt lenses in all or a significant portion of their usable surfaces. Steeply curved lenses have the potential of providing many advantages including eye protection and increased field of view. Such lenses may be used in cosmetically desirable eyewear.

Various types of steeply curved, wide field spherical lenses are disclosed in the above-mentioned patent application Ser. No. 09/223,006. Other types of highly curved lenses are disclosed in International Application number PCT/AU99/00430 to Morris et al., (International Publication No. WO 99/63392) the contents of which is hereby incorporated by reference in its entirety. Among other things, these applications disclose novel ophthalmic lenses, all or a portion of which have steep base curvatures. For example, Ser. No. 09/223,006 discloses a powered ophthalmic lens having at least one spherical surface with a radius of curvature less than about 35 mm. As another example, International Application number PCT/AU99/00430 discloses various lens shapes including "bowls" and "ovaliforms", at least portions of which are steeply curved. Such lenses are characterized by large sagittal or hollow depths.

Applicants have investigated methods for fabricating steeply curved lenses by employing molding processes. Though some usable lenses were made, difficulties were encountered in fabrication of such lenses using conventional molding processes due to the steep curves, large sagittal depths and thin regions encountered in these lens designs.

Accordingly, it is an object of the present invention to provide methods for effectively and economically molding steeply curved and/or thin-centered lenses.

It is another object of the present invention to provide steeply curved and/or thin-centered lenses lacking surface defects or internal defects produced by conventional molding processes.

These and other objects and features of the present invention will be apparent from this written description and associated drawings.

SUMMARY OF THE INVENTION

This invention is directed to novel molding methods for manufacturing steeply curved and/or thin centered thermoplastic lenses. The methods are particularly well adapted for the manufacture of lenses having a center portion of thickness less than about 2 mm. The methods of this invention can produce thermoplastic lenses without knit lines, witness marks or excessive stress in the thinnest portions.

In preferred embodiments, this invention relates to molding methods for the preparation of steeply curved lens elements with thin centers. The methods involve overfilling of the mold cavity followed by compression of the lens mold sections prior to freezing of the thermoplastic melt. Subsequently, the mold halves are maintained in place while pressure is increased on the thermoplastic melt to compensate for the shrinkage which occurs during solidification of the melt in the mold. Subsequent cooling of the mold results in formation of a lens element with novel properties.

The methods of this invention are particularly advantageous in that a molding process is employed wherein crushing of the thin lens by the molds during manufacture is avoided. The methods may also avoid the formation of knit lines and witness marks in such lenses.

Accordingly, in one of its method aspects, this invention is directed to a method for manufacturing a thermoplastic lens element which comprises:

(a) providing a mold comprising movable sections wherein said sections, when closed, define a mold cavity in the form of a thermoplastic lens element having an optical surface at least a portion of which has a maximum principle curvature in a local region characterized by a radius of curvature of less than about 35 mm;

(b) introducing into the mold cavity a molten thermoplastic material in a quantity at least sufficient to form the lens element;

(c) moving at least one of said mold sections to a predetermined hard stop point and stopping said at least one mold half at said hard stop point prior to freezing of the thermoplastic material at the thinnest point of the to-be-formed lens element;

(d) maintaining said mold halves in a stationary position at said hard stop point while controlling pressure in the mold cavity to maintain a constant volume within the mold; and (e) permitting the thermoplastic material to freeze thereby forming the steeply curved thermoplastic ophthalmic lens element.

In one embodiment, the mold pressure in the mold cavity is increased by injection of further melted thermoplastic resin into the mold. In another embodiment, this increase in internal cavity pressure is achieved by an injector, or by use of one or more screws, secondary pistons, pins, or other mechanisms.

In a second of its method aspects, this invention provides a method for manufacturing a thermoplastic lens element which comprises:

(a) providing a mold with movable sections which when moved to predetermined positions define a mold cavity in the shape of a steeply curved lens element to be molded;

(b) introducing into the mold a volume of molten thermoplastic material in excess of the volume of the steeply curved lens element to be molded;

(c) prior to the cooling of the thermoplastic material at its thinnest point below its glass transition temperature, moving the mold sections relative to each other to a position to define a cavity of a volume approximately equal to that of the steeply curved lens element to be molded; and (d) maintaining the mold sections in said position while applying hydraulic pressure to the thermoplastic material in the mold until the thermoplastic material in the mold freezes into the steeply curved lens element being molded.

The present invention also includes an injection molded, steeply curved lens element having an optical surface at least a portion of which has a radius of curvature less than about 35 mm, the lens elements being formed without knit lines or witness marks in the central optical portion of the lens. In preferred embodiments, the lens element is a lens blank adapted for making an edged lens with large sagittal or "hollow" depth. The lens blank may be semispheric having at least one spherical surface with a radius of curvature less than about 35 mm.

In the case of a negative powered lens, the lens element may have a thin central section with a minimum thickness less than 2 mm. The lens element may have at least one optical surface which lies within a spherical shell defined by two concentric spheres having radii whose lengths differ by no more than 2 mm, the smaller of the radii being no more than 50 mm in length and wherein at least two points O and Q on the edged lens subtend an angle OPQ greater than 80° with respect to the center P of the shell.

Using the designs of application Ser. No. 09/223,006, the present methods may, for example, be used to mold lens elements which in preferred embodiments have a base curve of 16.0 D±approximately 0.5 D and which exhibit relatively low RMS power error over at least approximately forty degrees of eye rotation from optical center. Such lens elements may be made in the form of edged lenses having a through power from the temporal to nasal edge of the lens varying by no more than 0.5 D from the prescription power.

The foregoing has been provided as a convenient summary of certain aspects of the present invention. However, the invention intended to be protected is defined by the claims and equivalents thereof.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 8(a), 8(b) and 8(c) are a comparison of the cross-sections and moldings of powered steeply curved lenses with correspondingly powered, low curvature lenses;

DETAILED DESCRIPTION OF THE INVENTION

Figure 1:
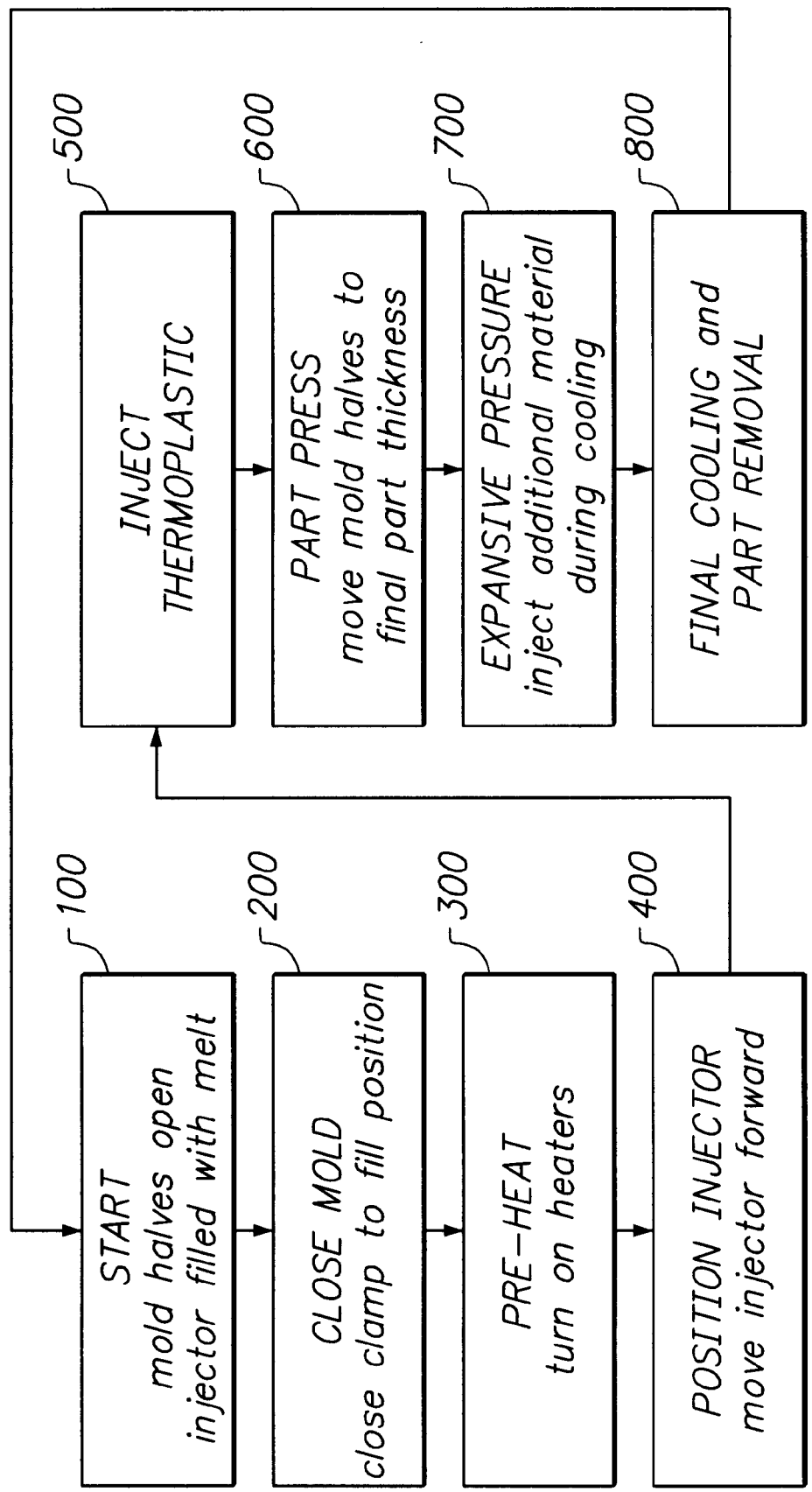
FIG. 1 is a flow diagram illustrating the methods of the present invention.

As noted above, this invention relates to novel molding methods for the manufacture of steeply curved thermoplastic lenses, as well as to novel thin thermoplastic lens elements. Prior to describing this invention in further detail, the following terms will first be defined.

Definitions

As used herein, the following terms have the following meanings.

"Molten thermoplastic polymer" or "melt" refers to the softened physical state of an amorphous or crystalline thermoplastic polymer which permits the polymer to flow. Preferably, the molten thermoplastic material flows under pressure when it is heated above its glass transition ($T_g$) or melting temperature ($T_m$), respectively.

"Freeze" or "freezing" refers to cooling a molten thermoplastic polymer to a temperature wherein it no longer flows.

"Flows" or "flowable" refers to the ability of a molten thermoplastic polymer to flow at a flow rate of at least 3 mfi (melt flow index) as determined by ASTM Test No. D1238 which measures the flow rate or melt index by extrusion plastometer. "Thermoplastic" refers to polymers which are capable of reversibly softening or fusing when heated and hardening when cooled. Suitable thermoplastic materials are well known in the art and include, by way of example, polycarbonates, polyethylene terephthalate (PET), polyacrylics, polystyrenes, polyurethanes, polythiolenes, and other high index materials. Preferably, the thermoplastic material is polycarbonate.

"Stationary position" refers to a mold position wherein the mold sections or halves are substantially fixed in space and each mold half does not move more than about ±0.05 mm. Preferably there is no movement when the mold halves are in the stationary position. While force may be necessary to maintain the stationary position of the mold halves, additional force is not applied to bring the mold halves into closer proximity.

Molding Methods

The methods of this invention are directed to a molding processes for the preparation of thermoplastic lenses. These methods may employ a conventional mold comprising a male mold half and a female mold half wherein said mold halves, when closed, define a mold cavity in the shape of a lens. Any conventional molds can be used and are well known in the art. The invention also includes use of molds for steeply curved lens elements as described below.

The methods of the invention allow the manufacture of thin thermoplastic lenses having a thickness of about 2 mm or less at a thinnest portion without crushing or distorting the thin part of the lens. These thin lenses are achieved by fixing the mold halves after injection of thermoplastic and applying an expansive pressure to compensate for shrinkage of the thermoplastic during cooling.

In the methods of this invention, the mold cavity is formed by closing the male and female mold halves. Initially, the mold is closed to a position where a distance between the mold halves is greater than a final desired lens thickness. The closing process may entail movement of at least one or both of the mold halves to precisely define an enlarged mold cavity. Then, molten thermoplastic material, preferably heated above its $T_g$ is injected into the mold cavity. In a preferred embodiment, an injector for delivering the thermoplastic to the mold employs a short/hot runner to ensure that the thermoplastic material remains in a molten form during the injection process. In an alternative preferred embodiment, the thermoplastic material may be delivered via a heated injection port or, still further, a combination of a short/hot runner and a heated injection port can be used.

In another preferred embodiment, the mold halves are heated, preferably above the $T_g$ of the thermoplastic material during the injection process to ensure against premature freezing of the polymer melt. More preferably, for e.g., polycarbonate, the mold halves are heated to a temperature of above about 275° F. and even more preferably to a temperature of about 290° F. to about 340° F. Other thermoplastic materials would have other preferable or optimal working temperatures appropriate to their specific $T_g$ properties.

At least a sufficient amount of molten thermoplastic material is then added to the mold cavity to form the lens. In some cases, a slight excess of molten material may be added in order to ensure complete filling of the cavity. Obviously, the specific amount of such material employed corresponds to the dimensions of the to-be-formed lens which is readily ascertainable by the skilled artisan.

Subsequently, at least one of the male and female mold halves is moved toward the other mold half to compress the thermoplastic material and generate contractive pressure within the mold cavity while maintaining the polymer therein in the molten state. The closing of the mold halves continues until a hard stop point between the mold halves is reached. The distance between the male and female mold halves at this hard stop point may correspond to the desired center thickness of the to-be-formed finished minus $R_x$ lens which is about 2 mm or less, preferably 1.5 mm or less, more preferably from about 0.7 mm to 1.5 mm, and even more preferably from about 0.8 mm to 1.3 mm. For lens wafers intended for lamination these dimensions could be even thinner, with the most preferable thickness for a minus lens between 0.5 mm and 1.0 mm. Again, during compression, the thermoplastic material within the mold cavity is maintained in a molten state, including the material at the thinnest point of the to-be-formed lens, when this hard stop point is reached.

At this point, the mold halves are then maintained in a stationary position while controlling pressure within the mold cavity in order to compensate for thermoplastic shrinkage in the mold cavity during freezing thereby maintaining conformity of the thermoplastic material to the mold. The mold cavity pressure is preferably controlled through an increase in cavity pressure preferably achieved by expansive pressure. In one preferred embodiment, expansive pressure is created within the cavity by use of one or more injectors which injects additional molten thermoplastic material into the mold cavity as needed. As before, the injector(s) and/or injector port(s) can optionally be heated to ensure that the additional thermoplastic injected material remains in a molten form. The expansive pressure is preferably applied until freezing is complete or substantially complete.

In another preferred embodiment, expansive pressure is created within the mold cavity by use of one or more screws, secondary pistons, pins, flexible compression rings, bellows, or the like. These screws, pins, or pistons, apply a force to the thermoplastic material during freezing to compensate for shrinkage. The force is preferably applied inwardly from the sides of the mold cavity or substantially perpendicular to the direction of mold opening and closing.

Once such expansive force is established within the mold cavity, the thermoplastic material is cooled and, upon freezing, a suitable lens is formed. In one preferred embodiment, cooling and subsequent freezing of the thermoplastic material is achieved by cooling of the molds. As discussed above, the use of expansive force at this point in the manufacturing process inhibits crushing at the thinnest point of the lens which freezes first.

FIG. 1 is a flow diagram illustrating the method according to one embodiment of this invention. FIGS. 2–6 illustrate the steps of the method according to the present invention as it is performed with one exemplary mold system.

The process for forming a thermoplastic lens according to one embodiment of the present invention begins at step 100 with the mold halves in an open position to remove the previously formed part and with the injector filled with a thermoplastic material. In step 200 the mold is closed to a predetermined position in which the mold halves are separated by a space which is greater than the size of the final to be formed lens. During or after mold closing, the mold is preferably heated in a preheating step 300. In addition to or as an alternative to preheating the mold, the injector may be heated. During or after preheating in step 400, the thermoplastic material injector is moved forward so that the injector contacts a fill port of the mold in preparation for the injection of the thermoplastic material. Alternatively, the injector may be engaged into the mold cavity prior to heating, in which case steps 300 and 400 may be reversed. In step 500, the thermoplastic material is injected at a high pressure. Following injection of the thermoplastic material, step 600 involves part press or coining in which the mold halves are moved towards each other to a final part thickness and some of the injected material may be pushed back into the injector barrel. In step 700, expansive pressure is applied to the thermoplastic material within the mold. As described above, this expansive pressure may be applied in a variety of ways. For example, expansive pressure may be applied by injection of addition thermoplastic material during cooling. Finally in step 800, final cooling of the part, opening of the mold, and part removal are performed. Once the part has been removed the process returns to step 100 for formation of another part.

Figure 2:
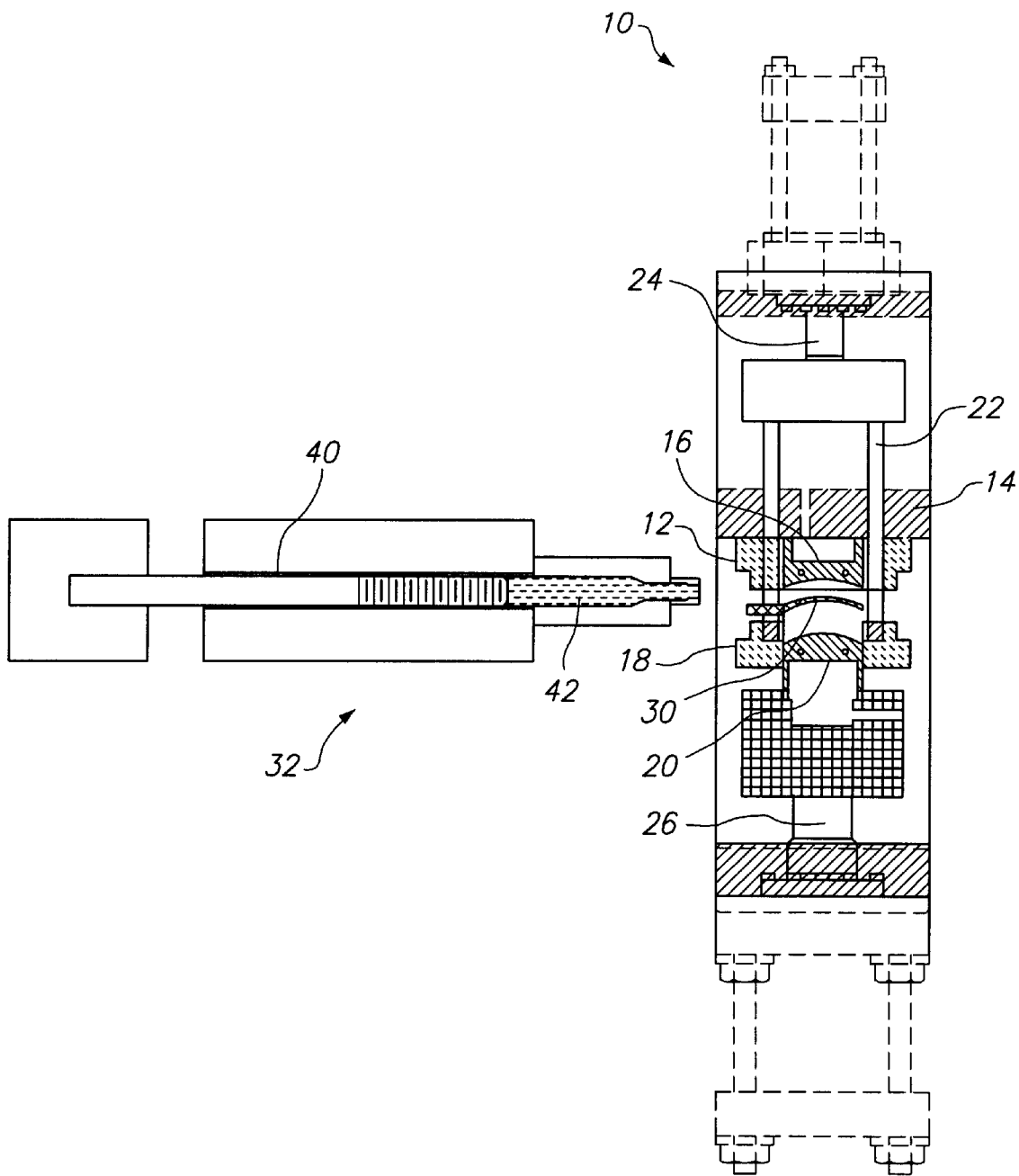
FIG. 2 is a schematic side view of a mold in a starting position.

FIG. 2 illustrates a mold 10 in a starting position in which the mold halves are in an open position. The mold 10 includes an upper mold cavity half 12 which is fixed to a bolster plate 14. The upper mold cavity half 12 has an upper mold member 16 which is also fixed to the bolster plate 14. Alternatively, the upper mold member 16 may be movable within the upper mold cavity half 12. The mold 10 also includes a lower mold cavity half 18 with a movable lower mold member 20. The lower mold cavity half 18 is connected by a plurality of connecting rods 22 to a hydraulic cylinder 24 which is positioned above the upper mold cavity half 12. The connecting rods 22 extend through the upper mold cavity half 12 to move the lower mold cavity half 18 with respect to the upper mold cavity half. The lower mold member 20 is movable within the lower mold cavity half 18 by a second hydraulic cylinder 26 positioned below the lower mold member. In the starting position illustrated in FIG. 2, both the lower mold cavity half 18 and the lower mold member 20 are lowered to allow the prior part 30 to be removed from the mold 10.

The mold 10 is also provided with an injection unit or injector 32 having a barrel 40 used to melt thermoplastic pellets to prepare the thermoplastic material 2 for injection into the mold cavity. The upper and lower mold members 16, 20 are preferably heated by passing heated fluid through channels in the mold members. In another preferred embodiment, electric heat can be generated by electric cartridge heaters thermally coupled to the mold inserts optionally containing heated fluid channels. The heating of the mold members 16, 20 allows the thermoplastic material 42 to be injected completely before the material begins to cool.

Figure 3:
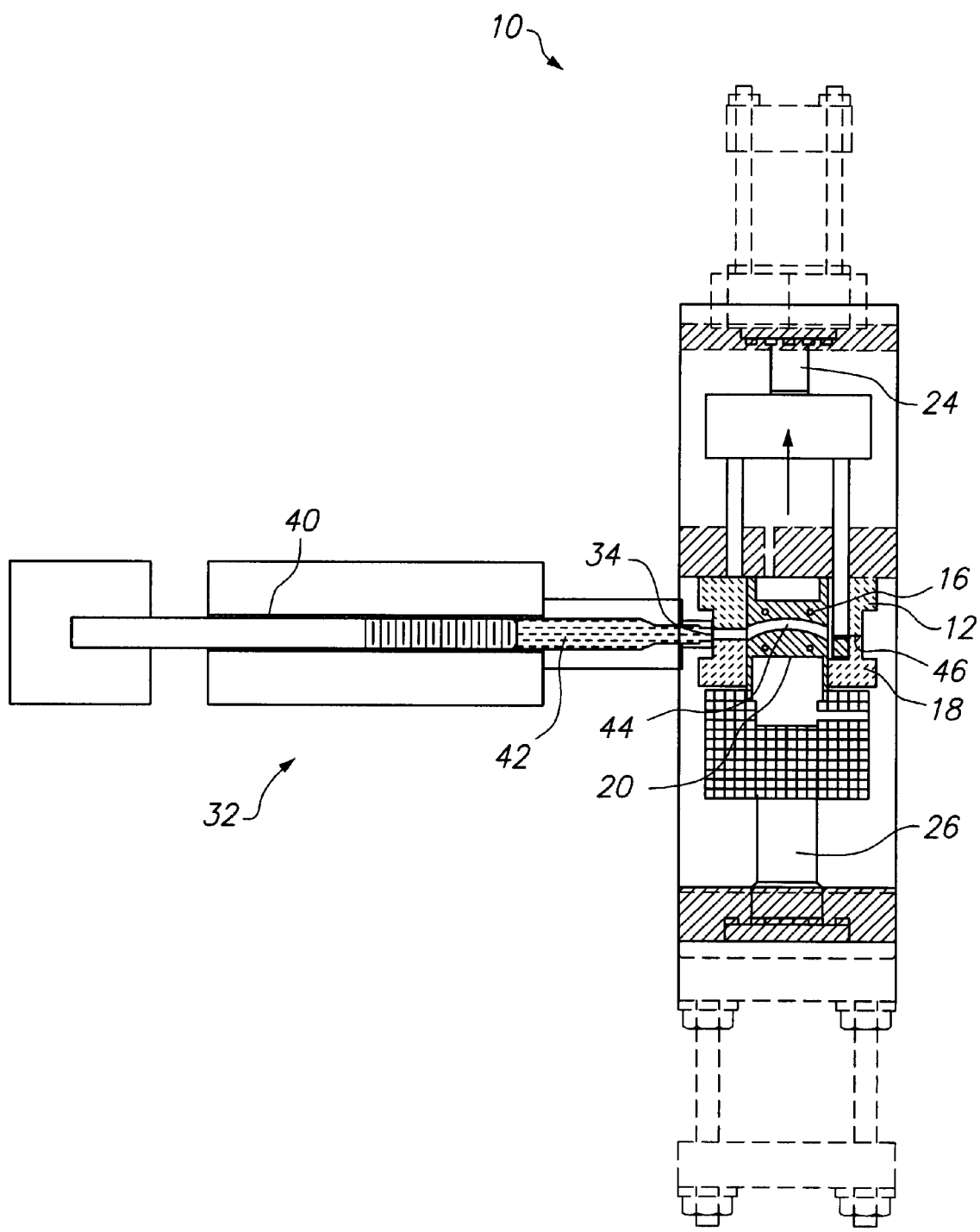
FIG. 3 is a schematic side view of the mold of FIG. 2 in a filling position.

FIG. 3 illustrates the mold 10 in a closed position in preparation for filling the mold cavity with thermoplastic material 42. As shown in FIG. 3, the lower mold cavity half 18 and lower mold member 20 are moved to the closed position by the upper hydraulic cylinder 24. The closing of the lower mold cavity half 18 against the upper mold cavity half 12 closes the parting line 46 of the mold. In the position illustrated in FIG. 3, a distance between the upper mold member 16 and the lower mold member 20 is greater than the final desired part thickness. Preferably, the distance between the mold halves is approximately 1 to 5 mm greater than the final part thickness. FIG. 3 also illustrates the injector 32 moved against the fill port 34 of the mold cavity 44 in preparation for filling of the mold. At this time, the mold is in the ready position illustrated in FIG. 3 and the mold and/or the injector unit 32 have been preheated to ensure that the thermoplastic material 42 remains in a molten form during the injection process.

Figure 4:
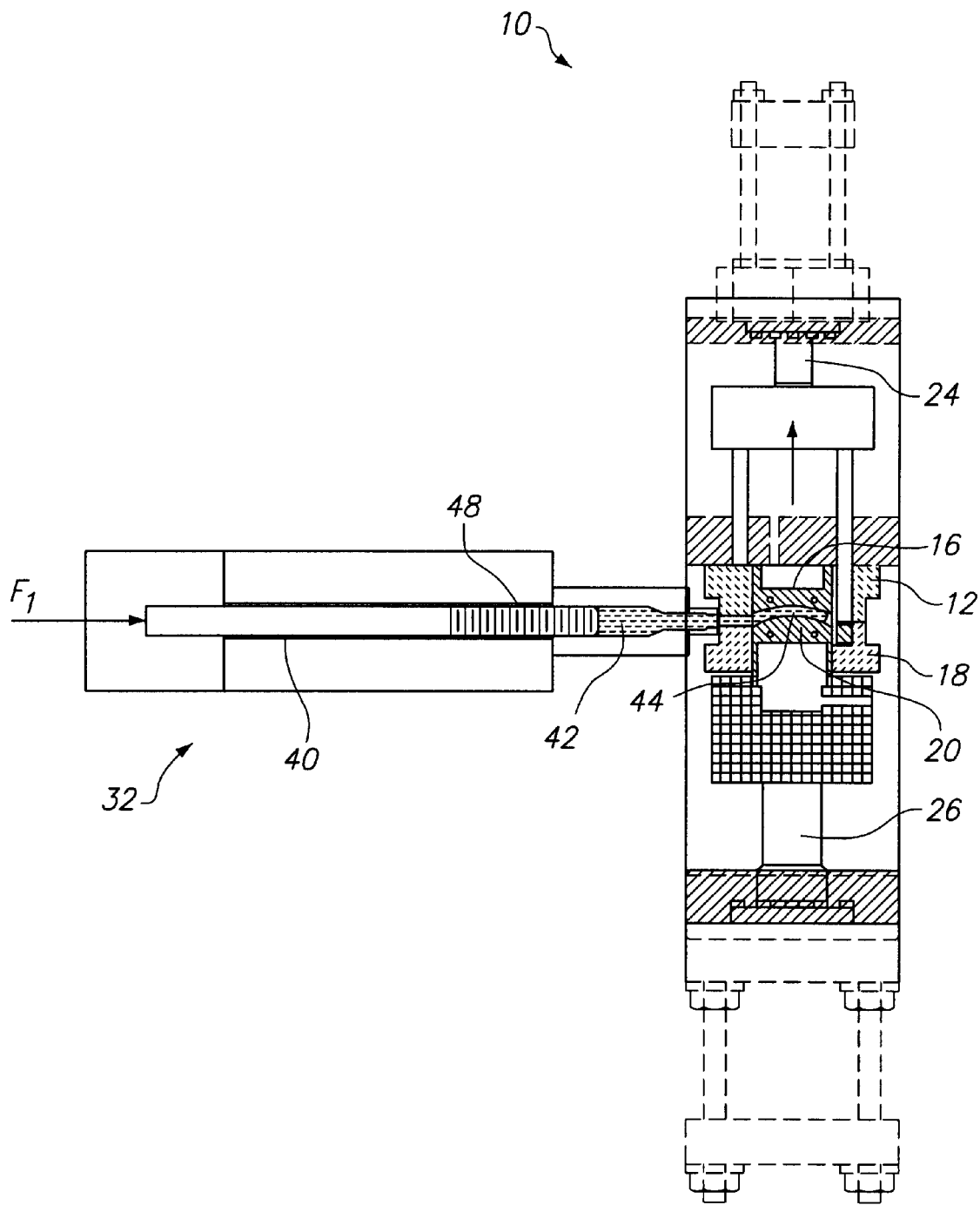
FIG. 4 is a schematic side view of the mold of FIG. 2 during filling.

FIG. 4 illustrates the mold 10 during injection of the molten thermoplastic material 42 into the mold cavity 44. During injection, the space between the upper mold member 16 and the lower mold member 20 is preferably maintained at a distance which is larger than the final part thickness. Preferably, the mold halves are held stationary during the mold cavity filling or injection step. The injector 32 may be operated by advancing a screw 48 within the barrel 40. Mold cavity filling is performed at a high pressure $F_1$, such as 10,000 psi to 20,000 psi.

Figure 5:
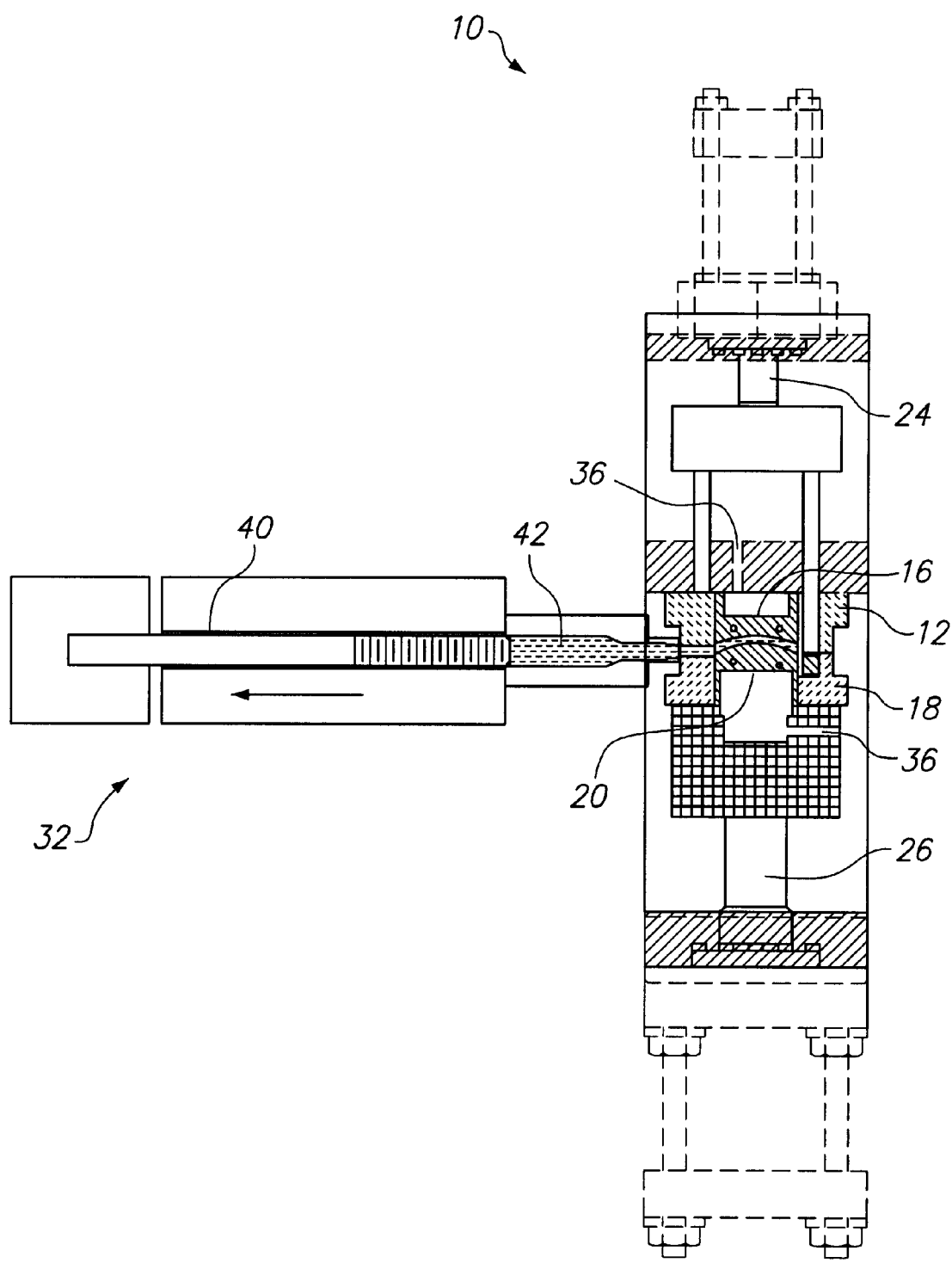
FIG. 5 is a schematic side view of the mold of FIG. 2 during pressing.

FIG. 5 illustrates the part-press step in which the mold halves 16, 20 are moved toward each other after the molten thermoplastic material 42 has been introduced into the mold cavity 44. In the mold illustrated in FIGS. 2–6 the pressing process is performed by activating the lower hydraulic cylinder 26 to move the lower mold member 20 towards the upper mold member 16. The process is complete when the two mold halves are in their final position and a distance between the upper and lower mold members 16, 20 is substantially the desired thickness of the final lens. In the mold illustrated in FIG. 5, the end of the pressing process or the bottom out point is determined by physically limiting the stroke of the lower hydraulic cylinder 26. Preferably, during the pressing process the injector 32 is optionally shut off so that no additional thermoplastic material 42 is injected. In another optional embodiment, some of the thermoplastic material 42 may be pushed back into the injector 32. Once the pressing process is finished the mold halves 16, 20 are held stationary. After the process, cooling air begins to be injected into the mold for cooling of the part. The cooling air is injected through the channels 36 in the upper and lower mold cavity halves 12, 18. Although cooling with cooling air or other fluid is preferred, cooling by natural convection may also be used.

Figure 6:
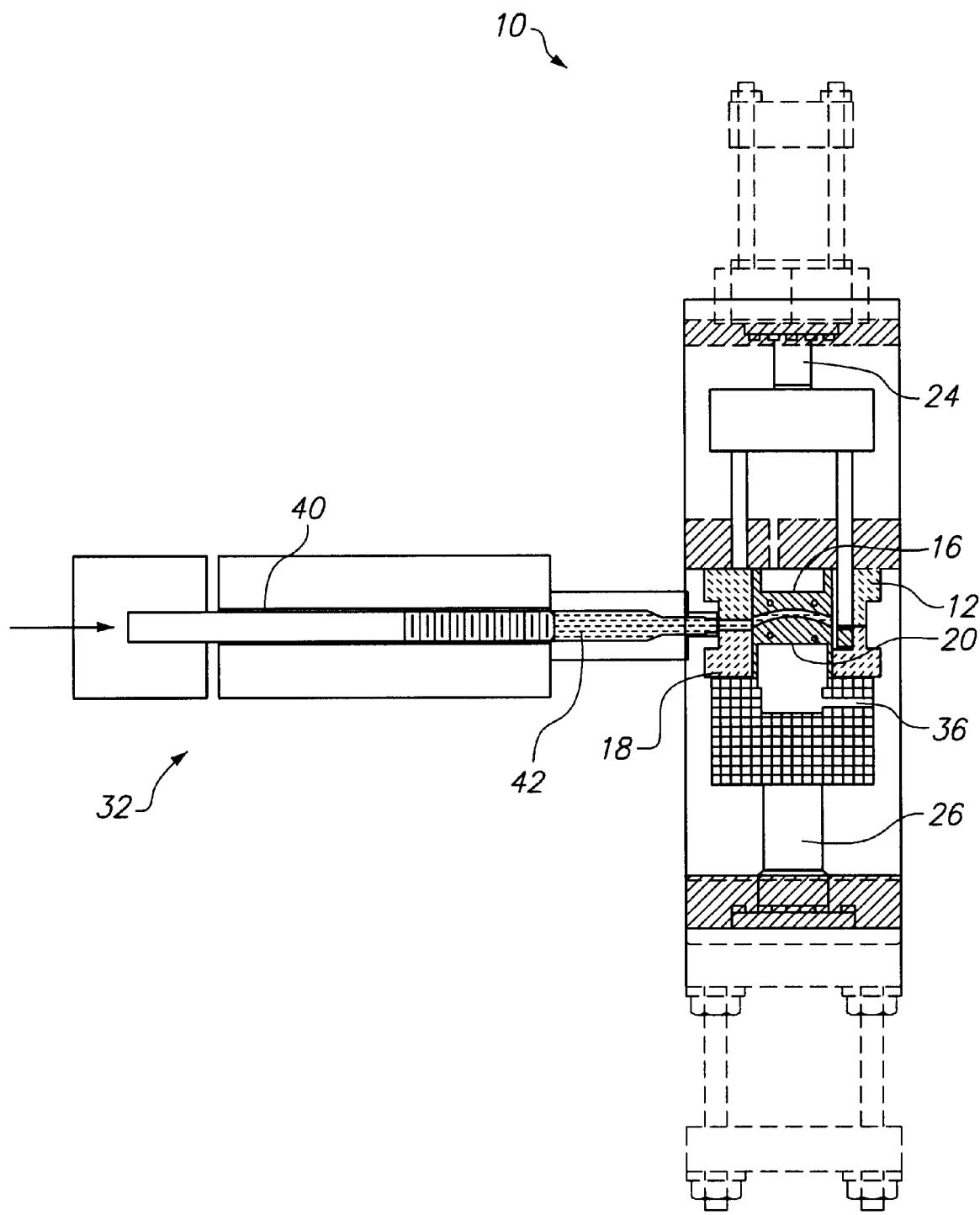
FIG. 6 is a schematic side view of the mold of FIG. 2 in a final cooling position.

The final holding and cooling position of the mold 10 is illustrated in FIG. 6. In this position, expansive pressure is applied to the thermoplastic material 42 in the mold cavity 44 to compensate for shrinkage of the part during cooling. The expansive pressure is applied, in the embodiment illustrated in FIGS. 2–6, by injecting additional thermoplastic material 42 at a low injection force with the injector 32 as the part solidifies. The upper and lower mold members 16, 20 are maintained stationary during the application of the expansive pressure. The injection pressures of the injector 32 during the application of expansive pressure are preferably low pressures, such as about 3000 psi to 7000 psi. After a predetermined cooling period the application of the expansive pressure is turned off by turning off the injector 32, final cooling occurs, and the mold is opened for part removal.
Molded Lens Elements Including Steeply Curved Ophthalmic Lenses Generally, the present invention relates to ophthalmic lens elements for eyewear such as prescription spectacles, sunglasses, protective eyewear, etc. Ophthalmic lens elements may include, according to context, finished or edged ophthalmic lenses, semi-finished lenses, lens blanks or molds therefor. Also included are wafers for forming laminated lenses or laminated lens blanks.

Figure 7A:
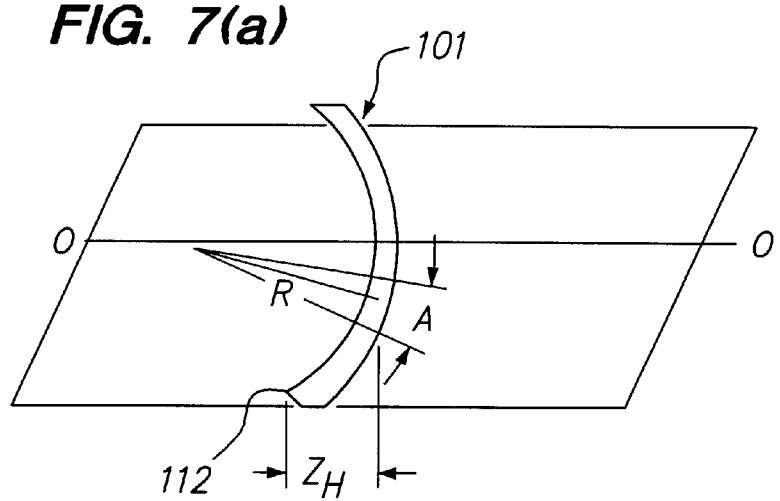
FIGS. 7(a)–(c) are cross-sectional views of examples of steeply curved ophthalmic lenses.
Figure 7B:
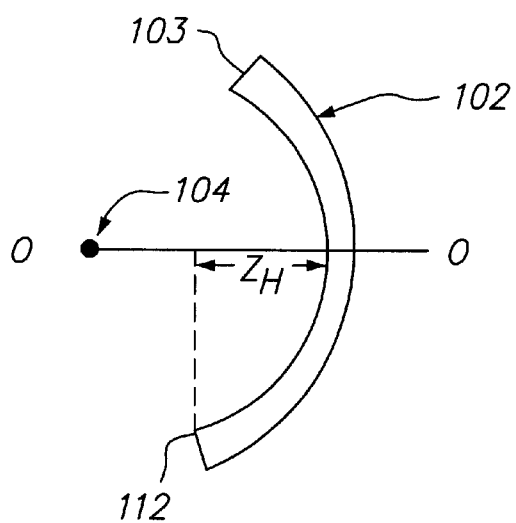
Figure 7C:
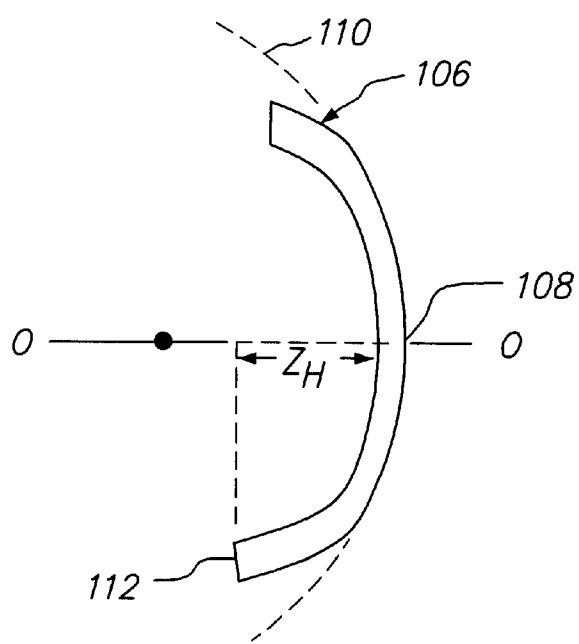

An important application of the molding techniques described above is the making of steeply curved ophthalmic lens elements. FIGS. 7(a)–(c) provide cross-sectional views of several examples of steeply curved lens. The lens 101 of FIG. 7(a) is described in greater detail in the International Application PCT/AU99/00430. It has an optical axis O—O as described therein. The curvature of the front and back optical surfaces vary from place to place on the lens. At least portions of the lens may be characterized by curvatures which are relatively steep or radical in comparison to traditional Ostwalt section lenses. Such a region is shown at A in FIG. 7(a). In at least this region, an optical surface of the lens is describable as having a radius of curvature R in a radial plane P of less than about 35 mm. This is not to imply that the radius of curvature is constant in the region A. Rather, the example is provided only as an illustration of the general steepness of the curvature of the optical surface.

FIGS. 7(b) and (c) present other examples of cross-sections of steeply curved lenses. Lenses of this general type are sometimes referred to as bowls or ovaloids. It will be understood that when edged, the bowl may have a non-circular rim which is adapted to the spectacle frames or mountings desired.

The spherical bowl 102 of FIG. 7(b) has an edge or rim 103. It will be understood that the lens elements disclosed in the above-mentioned United States application Ser. No. 09/223,006 may have the general shape shown in FIG. 7(b). Such lens elements may be characterized by a generally constant radius of spherical curvature of 35 mm or less, centered on the centroid of rotation 104 of the eye in the as worn condition. An optical axis of the lens O—O is shown intersecting the centroid of rotation 104. The spherical bowl 102 is radially symmetric about axis O—O. When worn, it may require no optical axis tilt or offset from the visual axis of the wearer.

FIG. 7(c) illustrates an oblate bowl. The bowl shaped lens element 106 of FIG. 7(c) is also radially symmetric about its optical axis O—O. It is characterized by a relatively gentle instantaneous spherical curvature at a sphere point 108 located at about the intersection of the optical axis O—O with the lens element surface. The curvature becomes steeper radially outwardly from the axis O—O. The effect is illustrated by a reference sphere indicated in cross-section by dashed line 110. The reference sphere has the same curvature as the instantaneous curvature of the lens element at the sphere point 108. As shown in FIG. 7(c) the lens element gradually deviates from the reference sphere as radial distance increases.

Figure 8C:
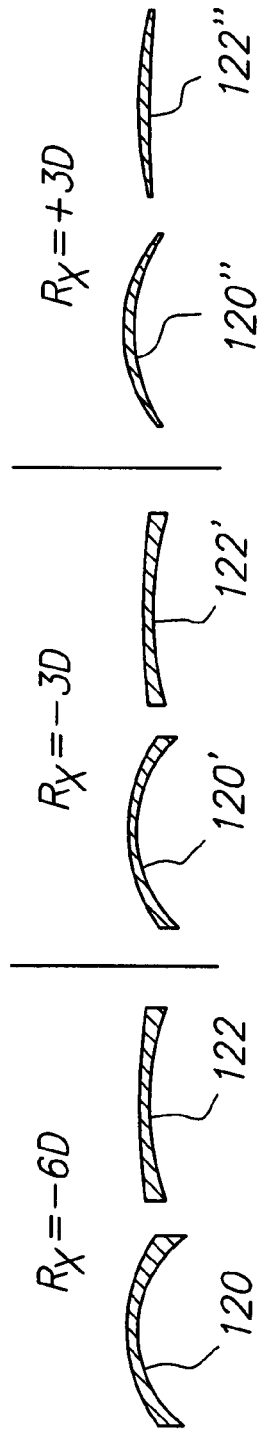
Figure 8C:
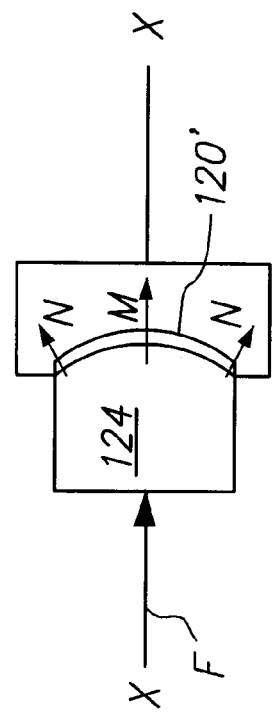

The shape of a lens made from the lens element of FIGS. 7(a)–(c) may be characterized by a hollow depth, $Z_H$. The hollow depth may be measured from a plane perpendicular to the axis O—O at the back surface of the lens and a point 112 which represents the most radially distant temporal edge point of the lens element. From the standpoint of molding techniques, the steepness of the curvature and a large hollow depth are indicia of difficulties in molding such lens element using conventional injection molding techniques. In particular in molding processes employing mold halves which are pressed together, the mold pressure may act substantially unequally on different parts of the lens element. This problem is illustrated in FIG. 8.

FIG. 8(a) is a comparison of powered steeply curved lenses 120 with correspondingly powered, low curvature Ostwalt section lenses 122. Pairs of negative lenses (−6D, −3D) and of positive lenses (+3D) are shown.

Figure 8B:
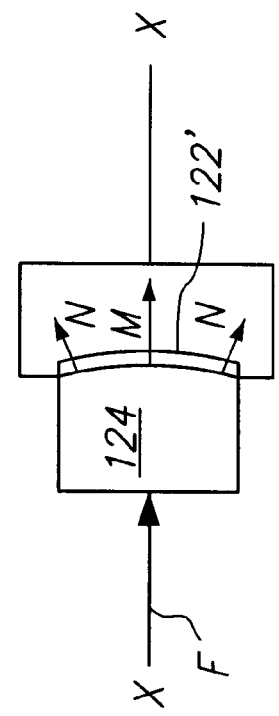

FIGS. 8(b) and (c) provide a comparison of the molding of a powered steeply curved lens 120' and the molding of a correspondingly powered low curvature lens 122'. In FIGS. 8(b) and (c) male mold members 124 are pressed against the lens during conventional molding as indicated by force vector F directed along axis X—X. In the case of the conventional lens element 122' of FIG. 8(b) the force N exerted normal to the surface of the conventional lens element 122' at its edges is approximately the same as the force M asserted normal to the surface at the center of the lens 122' being molded. In contrast, in the case of the steeply curved lens 120' of FIG. 8(c), the force N asserted normal to the lens surface at its edges is substantially lens than the force M asserted normal to the center of the steeply curved lens. These unequal forces may result in separations or distortions from the contour of the mold surfaces in areas of the lens located radially outward from the axis X—X. It may also result in excessive force and stress defects in the central region of the lens element. It will be understood that these difficulties will increase with lens curvature and hollow depth.

Figure 9A:
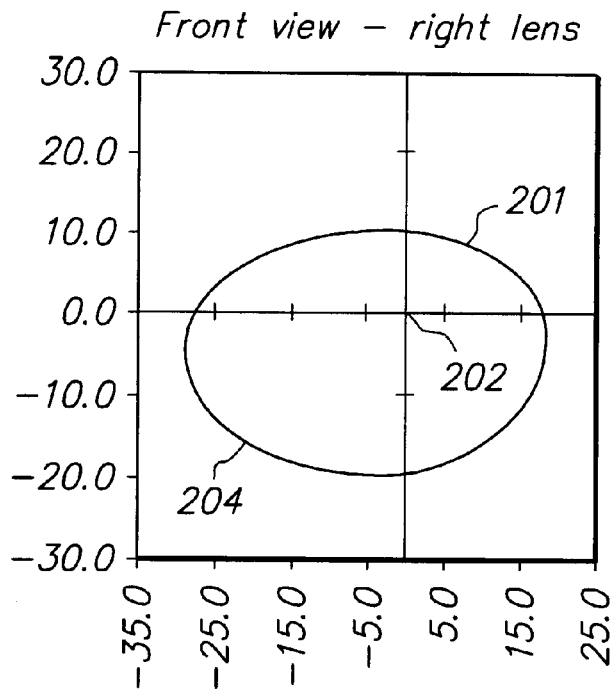
FIGS. 9(a), (b) and (c), 10 and 11 are schematic diagrams illustrating various aspects of the geometry of steeply curved lens elements.
Figure 9B:
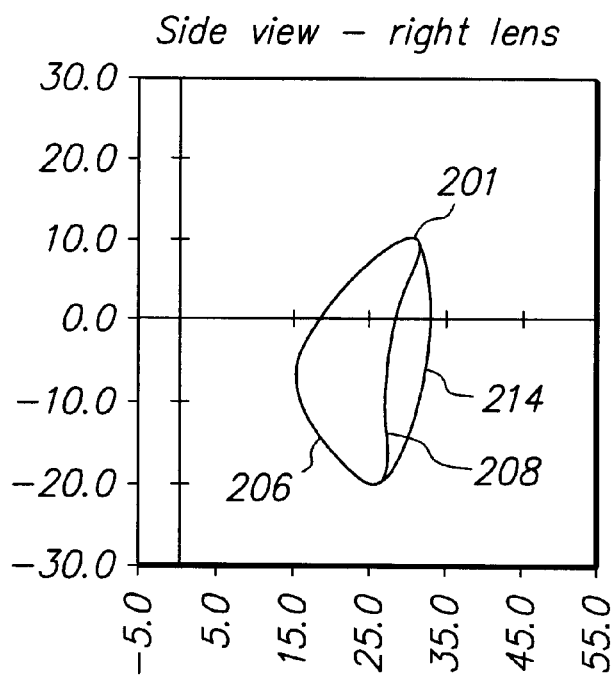

In a preferred embodiment of the present invention, wide field spherical lenses as described in the above-mentioned application Ser. No. 09/223,006 are fabricated. The basic geometry of such lenses will now be discussed in detail. FIGS. 9(a), 9(b) and 9(c) illustrate, respectively, front, side and top views of an dged lens 201 in accordance with the present invention. The origin 202, in FIG. 9(a), is the location of the optical center of the lens and the design location of the center of the pupil when worn. The outline 204 of the edged lens is indicated from a front view perspective in FIG. 9(a). In FIG. 9(b) the temporal edge 206 and nasal edge 108 of the lens are shown. In FIG. 9(c) the upper edge 210 and lower edge 212 of the lens are shown. In the lens embodiment of FIG. 9, the front surface of the lens is a steep spherical curve, the right-most extent of which is indicted by the line 214.

The steeply spherical curvature of embodiments of the present invention can be designed into the lens in a variety of ways. In the preferred embodiment, discussed above, the front surface of the lens elements is a s ingle radius sphere centered at or near the centroid of rotation of the eye. Alternatively, the back surface of the series of lens elements may be a constant steeply spherical surface and centered at or near the centroid of rotation. In these embodiments the other surface is of variable curvature, the curvature being selected to provide at least the appropriate through power for the wearer. For example, if a 16D spherical front surface is selected for the lens element series, a rear surface with a curvature of 20D on its major meridian and 18D on its minor meridian may be used to provide a −4D through power with a −2D cycl. Alternatively, if the constant radius surface of the lens element is placed on the back surface, then the corresponding surface selected for the particular prescription may be placed on the front surface.

In other alternatives, the lens element or a surface thereof is constrained to lie within a spherical shell. This geometry is illustrated in FIG. 10. Two concentric spheres 254 and 256 are defined by a center at Point P and two radii $r_1$ and $r_2$ where $r_2 > r_1$. Together, the spheres define a shell S. An edges lens 258 is shown having a nasal-most edge point Q and a temporal-most edge point O. A front surface 260 of the lens lies within the shell S.

A front surface of the optical lens element according to the present nvention may be a spherical, toric or rotationally symmetric aspheric surface. In order to improve vision further, the front and/or back surface of the optical lens element according to the present invention may deviate form a spherical form to provide improved optical performance and/or cosmetic appearance. The front and/or back surface, as described above, may be derived by the solution of the optimization problem to minimize a selected merit function representing a measure of optical aberrations seen by the wearer of the lens. The correction may alternatively, or in addition, improve the cosmetic appearance of the lens element. Alternatively the surface within the shell may be a multi-focal progressive lens as described in greater detail below.

In a preferred embodiment, the lengths of radii $r_1$ and $r_2$ differ by no more than 2 mm, and in a more preferred embodiment one of the radii is about 35 mm and the difference in the lengths of the $r_1$ and $r_2$ is about 0.1 mm or less. The front surface subtends an angle OPQ greater than 75°, preferably greater than 80° and more preferably greater than 90°. This angle is a measure of the wide field of view provided by the lens.

Alternatively, the lens may be defined to lie entirely within a shell defined in a manner similar to the shell S of FIG. 10, where the difference in lengths of $r_1$ and $r_2$ is less than 6 mm.

Additionally and alternatively, the lens may be defined as containing a portion of a steeply curved sphere such as the portion OQ of the sphere having radius $r_1$ in FIG. 10. The reference sphere may be a sphere which lies between the front and back surfaces of the lens element. In embodiments of the present invention this steeply curved sphere may define abutting surfaces of two lens wafers otherwise made in accordance with U.S. Pat. No. 5,187,505 which is hereby incorporated by reference. In such a case the ophthalmic lens or lens blank is formed as a laminate of back and front wafers. Because the abutting surfaces of the wafers are spherical, it will be understood that the wafers may be rotated to achieve the desired orientation of a cyl correction applied to one of the surfaces. This is particularly useful in providing progressive lenses. In one embodiment, the progressive refractive power and correction for the wearer's astigmatism may be placed on the back surface of the lens. This is particularly advantageous in steeply curved lenses. Otherwise, if the progressive prescription is placed on the front, 1) the change in surface reflection will likely be noticeable to an observer, and 2) framing may be difficult for large "add" progressives due to significant curvature changes.

Further alternatively, the steeply curved lens element can be molded as a semifinished blank. A rear surface can be generated and cut by a high speed diamond cutter. The back surface in combination with the front surface may provide the appropriate refractive power and astigmatism correction for the wearer.

Other aspects of the novel geometry of the lens elements of the present invention are illustrated in FIG. 11. A lens 270 with a steep spherical curvature, approximately concentric with the centroid 272 of the rotation of the eye, is shown. A fronto-parallel plane P is tangent to a spherical front surface 274 of the lens. The optical axis 276 of the lens is normal to the plane P and passes through the centroid of rotation of the eye. A back surface is identified by the numeral 278. The lens extends in a temporal direction to a temporal edge 280. The novel geometry of the lens is defined in part by a hollow depth $Z_H$ which is the perpendicular distance between the back surface 278 of the lens at the optical axis and the edge 280. A related dimension $Z_F$, is the distance between the fronto-parallel plane P and the edge 280.

Figure 12:
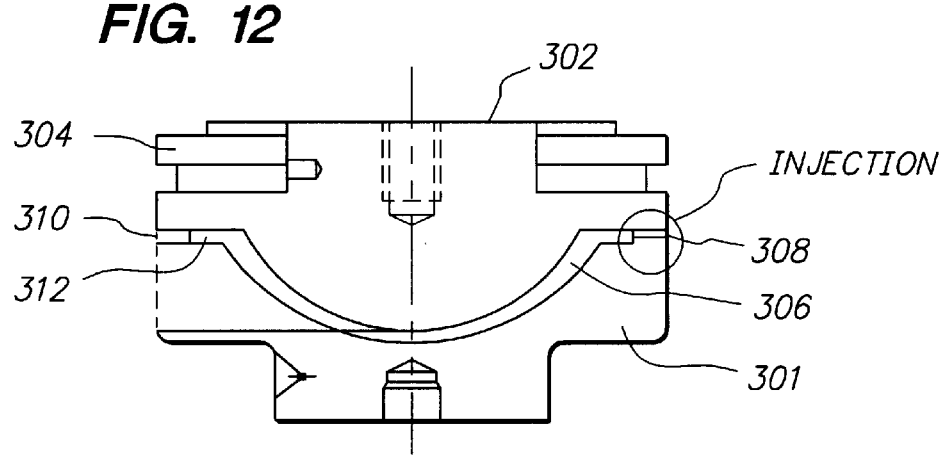
FIG. 12 is a cross-sectional side view of a mold which may be used to make one type of steeply curved, thin-centered lens element.

FIG. 12 illustrated a mold suitable for making a lens element in accordance with teachings of the present invention. The mold includes a front mold portion 301, a back mold portion 302 and closure flange portion 304. The lens element may be formed in the cavity 306 between the mold halves by injecting molten lens material through port 308. Air escapes through port 310. When the lens element is hard, the mold halves are separated. It will be observed that the lens element as it leaves the mold will have a radial flange 312, which may be removed in later processing.

Figure 13:
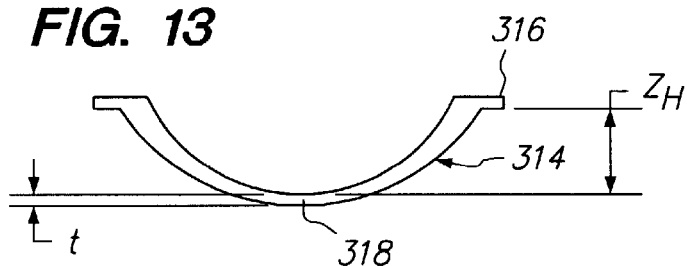
FIG. 13 is a cross-sectional side view of a wide field spherical negative lens blank which may be made with the mold of FIG. 12 and the molding techniques of the present invention.

The mold of FIG. 12 may be used in the molding process described above, to form steeply curved lens blanks. An example of lens blank so formed is shown in FIG. 13 and indicated by the numeral 314. The lens blank is semispheric in general form and has a lenticular run 316. In use, the lenticular rim and adjacent area would be removed to edge the lens. The lens blank shown in FIG. 13 is a negative lens and has a thinner central region 318, which in preferred embodiments may have a thickness, t, of 1.5 mm±1 mm. In negative steeply curved lens embodiments it may be less than 2 mm, and in current embodiments, 1.8 mm±0.1 mm. It may be desirable to reduce this thickness in steeply curved negative lenses to less than about 1 mm. The hollow depth $Z_H$ of the lens blank of FIG. 13 may be from about 13 to 20 mm depending on the power and base curvature of the blank.

Figure 14A:
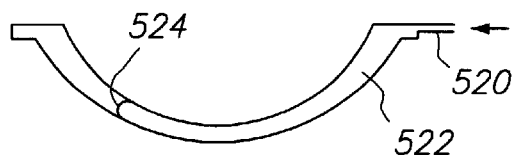
FIGS. 14(a) and (b) and 15(a) and (b) illustrate the formation and elimination of knit lines and witness marks.
Figure 14B:
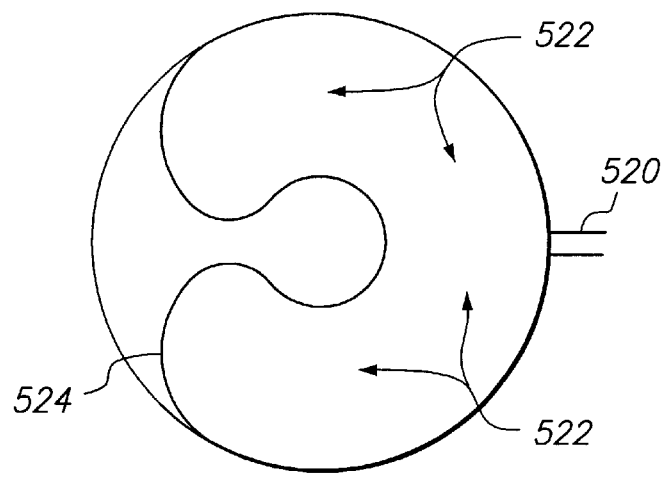
Figure 15A:
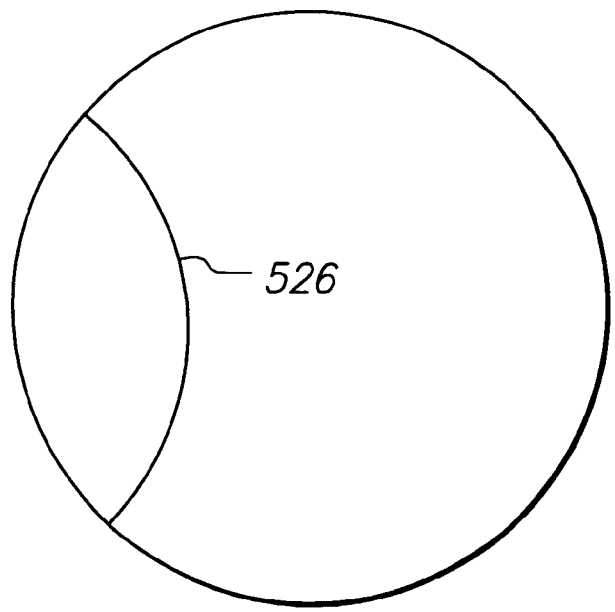
Figure 15B:
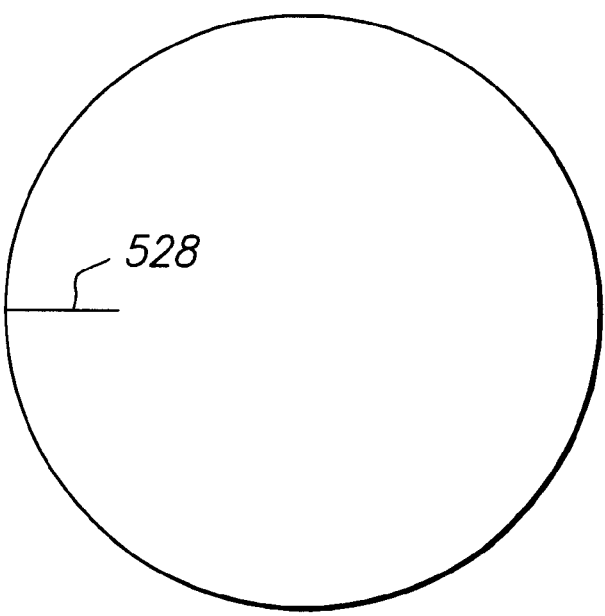

FIGS. 14(a). and (b) illustrate flow patterns which can occur in injection molding a lens blank with a thin center portion such as shown in FIG. 13. As shown, molten thermoplastic is injected through the injector conduit 520. The melt flows preferentially through the thicker portions 522 of the cavity and creates a flow front such as indicated at 524. In some situations the central region will not initially fill with molten material. In other situations the injection of additional material forms, in the finished lens element, a witness mark 526 such as shown in FIG. 15(a) or a knit-line 528 such as shown in FIG. 15(b). In addition, the central section of the lens may be compressed after freezing during conventional processing creating crazing or stress visible under polarized light. These effects may be aggravated in the case of a steeply curved lens. Ail of these defects are undesirable.

Applicants have determined that these defects can be reduced or eliminated, particularly in steeply curved lens element molding, by appropriate filling, closing and pressurizing of the mold cavity. More particularly, in accordance with a preferred embodiment of the present invention, an "oversized shot" is introduced into the cavity, e.g., a volume of molten thermoplastic material from 120 to 160% of the final volume of the lens being molded is injected into the mold. Most preferably, an excess of 40% of molten thermoplastic material is introduced into the mold cavity. The movable sections of the mold are then moved to predetermined positions to define a mold cavity with the shape and volume of the lens blank to be molded. This forces the excess material out of the mold cavity and back into the injector cavity where it may be reheated. In a preferred embodiment, the still molten material is forced back up the injector conduit and is available for molding subsequent lens elements. The use of excessive thermoplastic results in improved properties of the thermoplastic lens. That is, due to the use of an excessive amount of material, a longer working or processing time is achieved before the center of the lens element freezes or solidifies due to the larger heat capacity afforded by a larger amount of injected thermoplastic. The longer working or processing time, in turn, allows the thermoplastic to continue to flow outward from the mold center whereas with prior manufacturing techniques the center will have already frozen. Thus, witness marks or knit lines which typically occur during lens manufacturing are, in effect, pushed off the edge of the lens or away from the useful optical region as the thermoplastic material flows, particularly where a negative lens blank is being molded. While maintaining the mold sections in their predetermined position at a hard stop point, hydraulic pressure is then applied to the mold cavity through the injector conduit. The thermoplastic material is permitted to freeze in the mold, thus forming a steeply curved lens blank with optical surfaces conforming to the shape of the mold. Through the use of excessive material and the achievement of longer processing time, as discussed above, the present invention also allows the use of cooler molds than prior processing techniques. Cooler molds reduce the adhesion between the lens and the mold and thus facilitate removal of the lens upon completion of the molding process. The resultant lens blank is removed from the mold and is thereby formed without knit lines or witness marks in its central usable area. By use of this technique it is possible, for example, to mold a semispheric lens blank having at least one spherical surface with a radius of curvature less than about 35 mm and a minimum center thickness of less than 2 mm.

While the invention has been described in detail with reference to the preferred embodiments thereof, it will be apparent to one skilled in the art that various changes and modifications can be made and equivalents employed, without departing from the spirit and scope of the present invention.

We claim:

1. A method for manufacturing a steeply curved thermoplastic ophthalmic lens element which comprises:
    (a) providing a mold comprising a male mold half and a female mold half wherein said mold halves, when closed against one another, close a parting line of the mold, said mold further comprising a male mold member disposed within said male mold half and a female mold member disposed within said female mold half, wherein said mold members define, when said mold halves are closed, a mold cavity in the shape of the steeply curved lens element;
    (b) closing said mold halves of the mold so as to close the parting line of the mold, the distance between said mold members being greater than a final thickness of the to-be-formed lens;
    (c) after step (b), introducing into the mold cavity a molten thermoplastic material in a quantity at least sufficient to form the steeply curved lens element;
    (d) moving at least one of said male and female mold members to a pre-determined hard stop point and stopping said at least one mold member at said pre-determined hard stop point prior to freezing of the thermoplastic material at the thinnest point of the to-be-formed lens element, the distance between the mold members at the predetermined hard stop point being substantially equal to a final thickness of the to-be-formed lens;
    (e) maintaining said mold members in a stationary position at said pre-determined hard stop point while controlling pressure in the mold cavity; and
    (f) permitting the thermoplastic material to freeze thereby forming the steeply curved thermoplastic lens element.

2. The method of claim 1, wherein at least a portion of an optical surface of the steeply curved lens element has a radius of curvature less than 35 mm.

3. The method of claim 1, wherein the steeply curved lens element has maximum hollow depth of at least 8 mm.

4. The method of claim 1, where the steeply curved lens element is a negative lens with a thickness at its center of less than 2 mm.

5. The method of claim 4, wherein the molten thermoplastic material introduced into the mold cavity is of a volume significantly greater than that of the steeply curved lens element being molded.

6. The method of claim 5, wherein the moving of the mold members to the predetermined stop point forces any knit lines or witness marks away from the center of the lens element being molded.

7. The method of claim 5, wherein the volume of molten thermoplastic material introduced into the mold cavity is between 120% and 160% of the volume of the steeply curved lens element being molded.

8. The method of claim 1, wherein the thermoplastic material is selected from the group consisting of polycarbonates, polyethylene terephthalates (PET), polyacrylics, polystyrenes, polyurethanes, and polythiolenes.

9. The method of claim 8, wherein the thermoplastic material is polycarbonate.

10. The method of claim 1, wherein the cavity pressure is increased by use of at least one injector and injection of molten thermoplastic material into the mold cavity.

11. The method of claim 1, wherein the cavity pressure is increased by use of one or more screws, pistons, pins, or rings to apply a force to the thermoplastic material.

12. A method for manufacturing a steeply curved thermoplastic ophthalmic lens element which comprises:
    (a) providing a mold comprising movable sections wherein said 4 sections, when closed, define a mold cavity in the form of a thermoplastic lens element having an optical surface at least a portion of which has a local radius of curvature in a radial plane of less than about 35 mm;
    (b) introducing into the mold cavity a molten thermoplastic material in a quantity at least sufficient to form the lens element;
    (c) moving at least one of said mold sections to a pre-determined hard stop point and stopping said at least one mold half at said hard stop point prior to freezing of the thermoplastic material at the thinnest point of the to-be-formed lens element;
    (d) maintaining said mold halves in a stationary position at said hard stop point while applying pressure in the mold cavity by use of an injector or injectors to maintain a constant volume within the mold; and
    (e) permitting the thermoplastic material to freeze thereby forming the steeply curved thermoplastic ophthalmic lens element.

13. The method of claim 12, wherein the mold cavity is in the form of a lens blank with a hollow depth of at least 13 mm.

14. The method of claim 12, wherein the mold cavity is in the form of a lens element with a minimum thickness of less than 2 mm.

15. The method of claim 12, wherein the molten thermoplastic material is a polycarbonate material at a temperature above about 575° F.

16. The method of claim 12, wherein the movable mold sections are male and female mold halves.

17. The method of claim 12, wherein the mold pressure is increased by injection of molten thermoplastic material into the mold cavity.

18. A method for manufacturing a steeply curved lens element which comprises:
   (a) providing a mold with movable sections which when moved to predetermined positions close a parting line of the mold, said mold further comprising mold members disposed within said movable sections, wherein said mold members define, when said movable sections are closed, a mold cavity in the shape of a steeply curved lens element to be molded;
   (b) closing said movable sections of the mold so as to close the parting line of the mold, the mold members defining a cavity of a volume greater than a final volume of the steeply curved lens element to be molded;
   (c) after step (b), introducing into the mold a volume of molten thermoplastic material in excess of the volume of the steeply curved lens element to be molded;
   (g) prior to the cooling of the thermoplastic material at its thinnest point below its glass transition temperature, moving the mold members relative to each other to a position to define a cavity of a volume approximately equal to that of the steeply curved lens element to be molded; and
   (e) maintaining the mold members in said position while applying hydraulic pressure to the thermoplastic material in the mold until the thermoplastic material in the mold freezes into the steeply curved lens element being molded.

19. The method of claim 18, wherein the steeply curved lens element has an optical surface at least a portion of which has a local radius of curvature in a radial plane of less than about 35 mm.

20. The method of claim 1, wherein controlling pressure in the mold cavity comprises applying expansive pressure.

21. The method of claim 18, wherein applying hydraulic pressure comprises applying expansive pressure.

* * * * *